United States Patent Office 2,946,699
Patented July 26, 1960

2,946,699
PROCESS OF IMPREGNATING GRAPHITE WITH A URANIUM COMPOUND

Manuel C. Sanz, Los Angeles, Robert R. Randolph, Bellflower, and Chauncey Starr, Pacific Palisades, Calif., assignors, by mesne assignments, to the United States of America as represented by the United States Atomic Energy Commission No Drawing. Filed Mar. 24, 1947, Ser. No. 736,626

4 Claims. (Cl. 117—65)

This invention relates to atomic energy adapted for use in rocket propulsion, as well as nuclear chain reaction power sources generally.

It is an object of this invention to provide a new and novel arrangement of a body material embodying an active substance. (Active substance is defined as material capable of supporting nuclear chain reactions, including such materials as uranium, plutonium, and the like, as well as compounds of any of these materials. The active substance is carried by a body material which may serve only as a support for the active substance or as a moderator and support. In the case where the material serves only to support the active substance in such a way that the heat transfer can be effective, the reactor is known as a fast neutron reactor. Where the material serves also as a moderator, the reactor is known as a resonance neutron reactor, or a slow neutron reactor.)

It is another object of this invention to provide a moderator which effectively decreases the velocity of the neutrons involved in the nuclear chain reaction without appreciably absorbing them.

It is a further object of this invention to provide a new and novel process for impregnating a porous material with an active substance.

It is yet another object of this invention to provide a process which will result in a high ratio of impregnation of porous material with active substance.

It is yet another object of this invention to provide a process which will result in thorough and uniform impregnation of the porous material by the active substance.

It is still another object of this invention to impregnate the porous material with a salt of the active substance in such a manner that the salt provides the oxygen for obtaining the final form of the relatively stable active substance.

It is yet another object of this invention to impregnate a porous substance with a solution of a salt of an active substance in such a manner that a solution of high concentration is obtained by dissolving or melting it in its own water of crystallization.

Further objects of the invention will become apparent from the disclosure herein contained.

In carrying out the present invention the porous substance is impregnated by a vacuum-pressure process utilizing a compound or salt of a fissionable material, such as uranyl nitrate hexahydrate, $UO_2(NO_3)_2 \cdot 6H_2O$. The salt may obviously be composed of fissionable and non-fissionable material in desired proportions depending upon results desired. This salt is dissolved or melted in its own water of crystallization by heating at a temperature above 60° C. and then, after the impregnation, it is oxidized by heating to a temperature that will result in the formation of uranium trioxide ($UO_3$) or uranium oxide ($UO_2$). This is accomplished in the following manner:

Graphite is placed in a container containing uranyl nitrate hexahydrate. The container may then be evacuated to exhaust the air therefrom as well as from the porous graphite and thus facilitate impregnation of the graphite with the melted salt, although satisfactory results may be obtained by pressurization only. In any event, the atmosphere within the container is controlled according to results desired. The container is then sealed and heated to approximately 130° C. for a sufficient period of time to cause the salt to melt and be received in the graphite. (The salt melts at approximately 60° C. under normal conditions and at higher temperatures under evacuated conditions.) Continued heating results in the establishing of a pressure condition within the container. When the pressure condition has been continued a sufficient length of time to thoroughly impregnate the graphite with the salt, the impregnated graphite is removed from the container and first heated to drive off the water from the hydrous impregnated salt and then further heated to drive off $NO_2$ gas to convert the impregnated material to $UO_3$ or $UO_2$. It has been found that heating slowly to approximately 275° C. will result in conversion to $UO_3$ while heating to higher temperatures will result in other forms of uranium oxide. For instance, $UO_2$ will form at approximately 1400° C. In this embodiment of the invention, .2 to .25 gram of uranium metal has been included in each cc. of material of 25% porosity while approximately .4 to .5 gram of uranium has been included in material of approximately 40% porosity.

In another embodiment of the invention, the porous material may be impregnated in a vacuum-pressure process using the anhydrous uranyl nitrate, $UO_2(NO_3)_2$, and oxidizing the impregnated salt in one continuous process. As in the case of the uranyl nitrate hexahydrate, the process is finally carried on at a temperature of approximately 275° C. to form $UO_3$, although decomposition to the $UO_3$ state may take place at some lower temperature. The process may be carried on at higher temperatures to obtain uranium oxide in different forms, $UO_2$ being formed at approximately 1400° C.

In carrying out the process continuously, the graphite is placed in a container adapted to be evacuated and/or pressurized. $UO_2(NO_3)_2 6H_2O$ is placed in the container which may then be evacuated or pressurized, as desired, and heated until substantially all the water is driven off from the hydrous salt. A certain percentage of water is not objectionable and may serve to assist in the melting of the salt, since it will be driven off in any event at a later stage of the process. The container is then suitably pressurized, according to the result desired, to cause the resulting melted salt to be received within the graphite. Heating is then continued slowly up to 275° C. to break down the anhydrous salt and form $UO_3$. (The minimum temperature for the oxide formation is approximately 235° C.) $NO_2$ is driven off in the process, the container being suitably vented to the atmosphere to maintain the desired pressure within the system. The heating is continued until $NO_2$ gas ceases to be given off, this being an indication that the process is complete. At this time the pressure will drop within the container and the reaction substantially cease.

In this embodiment of the invention, approximately .45 gram of uranium has been embodied in each cc. of material of 35% porosity larger amounts being received in material of greater porosity. This form of the invention has certain advantages over the first described form in that by oxidizing the salt in one continuous process the salt is prevented from being extruded from the pores of the material upon cooling and subsequent reheating of the moderator or nuclear reactor.

The nuclear reactor may be formed by compounding active substance with the body material which carries the active substance or for use as a moderator in connection therewith. For instance, powdered graphite may be mixed with an active substance, such as a metal, metallic oxide, or metallic carbide, and then subjected to temperature and pressure conditions to form a nuclear reactor. The materials are combined, of course, in proportions depending upon results desired. The resulting compound may be obtained by sintering the body material and the active substance, or combining the porous substance with the molten metal or molten carbide of the metal. This procedure facilitates the impregnation of the body material in varying amounts so that reactor material of different proportions of active substance and moderator or body material may be obtained for use in different parts of the pile. In order to obtain a highly condensed reactor, the same may be formed by combining the active substance and body material under high temperature conditions and pressure conditions such as may be obtained by a ram. A reactor so formed is particularly adapted for use at high temperatures and locations where very high concentrations of fissionable material is desired.

Although the invention has been described in detail, it is to be clearly understood that the same is by way of example only, and is not to be taken by way of limitation, the spirit and scope of this invention being limited only by the terms of the appended claims.

We claim:

1. A process of forming reactor material comprising the steps of placing in a container uranyl nitrate hexahydrate, and graphite; heating the uranyl nitrate hexahydrate and graphite to a temperature greater than about 60° C. to melt the uranyl nitrate hexahydrate in its own water of crystallization so that it will then be absorbed by the graphite; and thereupon heating the graphite with the salt absorbed therein to a temperature greater than about 235° C. until the salt is converted into an oxide.

2. A process as recited in claim 1 in which the uranyl nitrate hexahydrate and graphite are heated to a temperature between 60° C. and 130° C. and the graphite, with the uranyl nitrate hexahydrate absorbed therein, is heated to a temperature above 235° C. and in the neighborhood of 270° C. to convert the salt to uranium trioxide.

3. A process as recited in claim 1 in which the graphite is of approximately 40% porosity and in which the graphite, with the uranyl nitrate hexahydrate salt therein, is heated to approximately 275° C. to embody in the graphite approximately 0.4 gram of uranium per cc. of graphite.

4. A process as recited in claim 1 in which the graphite is of approximately 25% porosity, and in which the graphite, with the uranyl nitrate hexahydrate salt therein, is heated to approximately 275° C. to embody in the graphite approximately 0.2 gram of uranium per cc. of graphite.

References Cited in the file of this patent

UNITED STATES PATENTS

| | | |
|---|---|---|
| 656,652 | Markey | Aug. 28, 1900 |
| 1,306,568 | Weintraub | June 10, 1919 |
| 1,520,437 | Pipkin | Dec. 23, 1924 |
| 1,821,176 | Driggs et al. | Sept. 1, 1931 |
| 2,098,062 | Palmer | Nov. 2, 1937 |
| 2,431,975 | Yockey et al. | Dec. 2, 1947 |
| 2,448,479 | Wilhelm et al. | Aug. 31, 1948 |
| 2,523,875 | Morrell et al. | Sept. 26, 1950 |

FOREIGN PATENTS

| | | |
|---|---|---|
| 114,150 | Australia | May 2, 1940 |
| 233,011 | Switzerland | Oct. 2, 1944 |

OTHER REFERENCES

Friend: "Text Book of Inorganic Chemistry," vol. VII, part III, pages 324, 325, 326 (1926), Charles Griffin & Co., Ltd., London.

Mellor: "Comprehensive Treatise on Inorganic and Theoretical Chemistry," vol. 12, pages 119–120, Longmans, Green & Co., London (1932).

Smyth: "Atomic Energy for Military Purposes," pages 103, 104, August 1945. (Copy may be purchased from Supt. of Documents, Washington, D.C.)

Kelley et al.; "Phy. Rev.," 73, 1135–9 (1948).